United States Patent
Nally

(10) Patent No.: US 6,526,565 B1
(45) Date of Patent: Feb. 25, 2003

(54) PACKAGING ALGORITHM FOR PROVIDING OBJECT ORIENTED APPLICATIONS HAVING REDUCED FOOTPRINTS

(75) Inventor: Martin Paul Nally, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/576,730

(22) Filed: Dec. 21, 1995

(51) Int. Cl.$^7$ ................................................ G06F 9/45
(52) U.S. Cl. ..................................... 717/108; 717/165
(58) Field of Search ............................... 395/701, 703, 395/710, 712, 683, 685, 702; 717/108, 106, 100, 165, 162; 709/315

(56) References Cited

U.S. PATENT DOCUMENTS

| | | | | |
|---|---|---|---|---|
| 4,330,822 A | * | 5/1982 | Dodson ...................... | 364/200 |
| 5,062,039 A | * | 10/1991 | Brown et al. ............... | 364/200 |
| 5,369,766 A | * | 11/1994 | Nakano et al. ............. | 395/700 |
| 5,414,854 A | * | 5/1995 | Heninger et al. ........... | 395/700 |
| 5,519,866 A | * | 5/1996 | Lawrence et al. .......... | 395/700 |
| 5,613,120 A | * | 3/1997 | Palay et al. ................. | 395/710 |
| 5,640,558 A | * | 6/1997 | Li ............................... | 395/612 |
| 5,644,771 A | * | 7/1997 | Endicott et al. ............ | 395/712 |
| 5,659,735 A | * | 8/1997 | Parrish et al. .............. | 395/610 |
| 5,758,160 A | * | 5/1998 | McInerney et al. ......... | 395/701 |

OTHER PUBLICATIONS

AT&T, UNIX System V Programmers Reference Manual, Prentice Hall, [LD(1)]. pp. 1–3, Dec. 1989.*
Prata, Stephen, C++ Primer Plus, Waite Group, pp. 9–12, Jan. 1995.*
D. J. Kruglinski, Inside Visual C++, Version 1.5, Microsoft Press, pp. 3–14, 0/0/94.*
W. Harrison et al, "Subject–Oriented Programming", OOPSLA'93, pp. 411–428, 0/0/93.*
H. Ossher, "Subject–Oriented Composition Rules", OOPSLA'95, pp. 235–250, 0/0/95.*

* cited by examiner

*Primary Examiner*—Sue Lao
(74) *Attorney, Agent, or Firm*—Gregory M. Doudnikoff

(57) ABSTRACT

A packaging algorithm for providing software applications having reduced footprints is presented. The algorithm determines the minimum required set of methods and classes from the development environment necessary for the application to run. The application is then packaged with only those necessary methods and classes. The resulting application has a reduced footprint which serves to reduce memory requirements needed to store the application and enhance performance of the application at run-time.

2 Claims, 7 Drawing Sheets

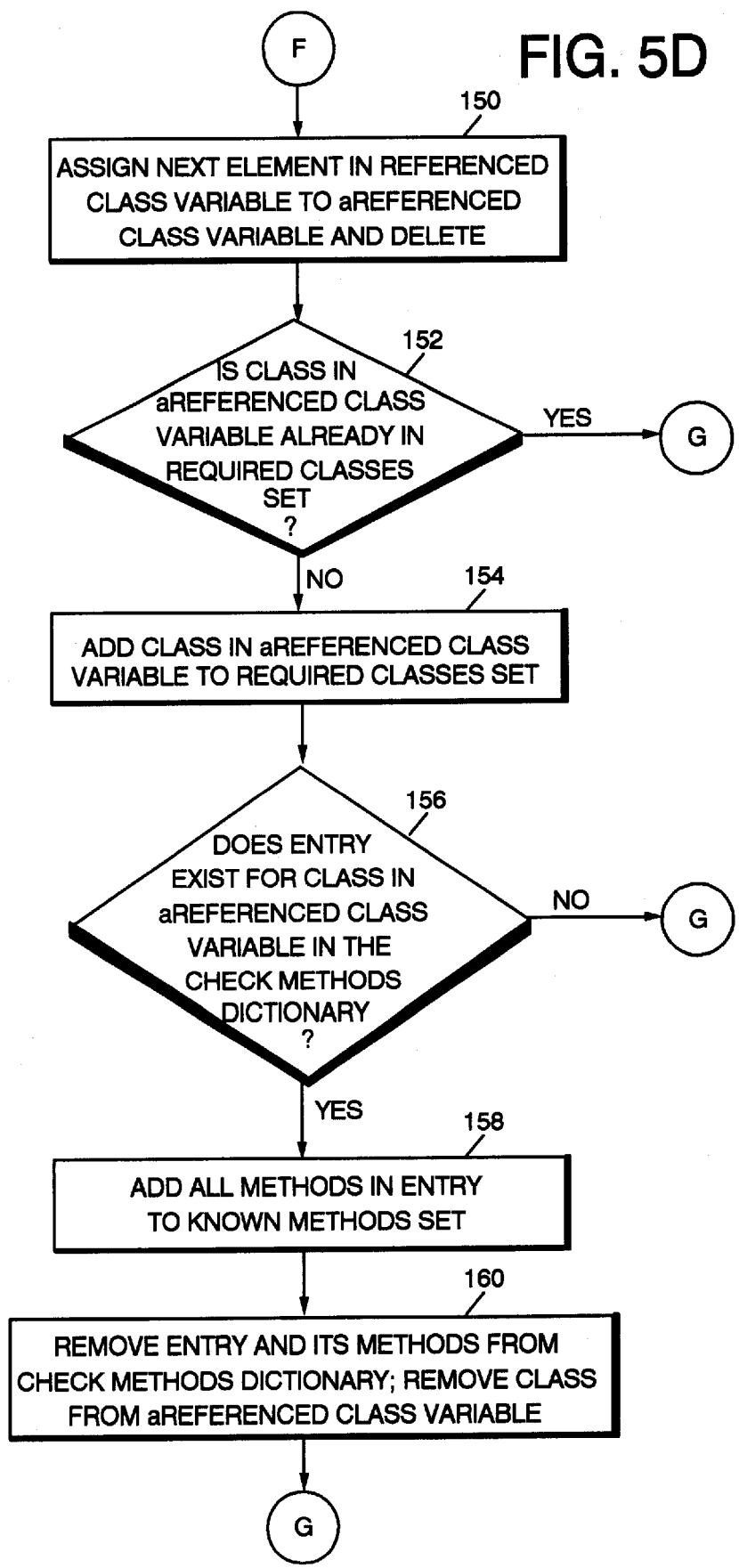

PACKAGING ALGORITHM FOR PROVIDING OBJECT ORIENTED APPLICATIONS HAVING REDUCED FOOTPRINTS

BACKGROUND OF THE INVENTION

1. Field of the Invention

The present invention relates to improvements in data processing systems and, more particularly, to a packaging algorithm for object oriented application development software which permits object oriented applications to be packaged without including extraneous classes or methods.

2. Description of the Related Art

The use of object oriented languages for writing or developing software applications has been gaining popularity in recent years. Object oriented technology has several advantages over procedural language technology, including relative ease of use, ease of modification, superior potential for reusability of components from application to application, etc. Object oriented software applications are typically developed by a software developer using an object oriented development environment. An object oriented development environment (such as VisualAge for Smalltalk from the IBM Corporation) typically includes the object oriented language, such as Smalltalk or C++, a variety of development tools, such as browsers, version management capabilities, and debuggers, and a set of reusable object oriented classes, components, parts and/or frameworks which provide different functions which a developer may desire for an application. The Smalltalk language includes an underlying engine known as the virtual machine which includes base functionality required to execute finished applications on a computer (and is typically packaged with applications), as well as a rich set of reusable object oriented classes, components, parts and frameworks. A developer basically pulls together instances of desired classes (objects) from the available classes, components, parts, and frameworks in order to create an application having desired function.

One aspect of object oriented languages is that the classes are typically interdependent and may possess a characteristic known as inheritance. Also, function is typically provided in that portion of an object known as a method. Thus, a method for one particular object may rely on a method in a different object or class to provide function. This characteristic of object oriented languages provides challenges to packaging schemes that seek efficiency.

To date, packaging of finished applications has never been an exact science. To be on the safe side, applications are packaged with complete standard class libraries with minimal discrimination together with the underlying engine to produce a run-time version of the application which can be executed by the computers of end-users. One drawback in object oriented languages has been that in order to make sure the application executes properly, packaging algorithms of the prior art have not been very discriminatory in which classes they include from the reusable class libraries in the development environment. Accordingly, the size of packaged object oriented applications has been relativey large, thereby placing large memory requirements on the end-user's computer. Also, the relatively large size of the applications can result in slower than desired performance when the applications are executed.

Accordingly, a need exists for a packaging algorithm for use in for application development tools which more precisely selects classes from the development environment for inclusion in packaged applications, so as to reduce memory requirements and enhance performance.

SUMMARY OF THE INVENTION

Accordingly, an object of the present invention is to provide an enhanced packaging algorithm for reducing the memory requirements of applications.

Another object of the present invention is to provide an enhanced packaging algorithm which results in enhanced performance of applications packaged using the packaging algorithm.

Yet another object of the present invention is to provide a packaging algorithm for application development environments which includes only those methods and classes which are necessary for execution of the application.

Other objects and advantages of the present invention will be set forth in part in the description and the drawings which follow, and, in part, will be obvious from the description, or may be learned by practice of the invention.

To achieve the foregoing objects, and in accordance with the purpose of the invention as broadly described herein, computer readable code is provided for determining a set of code from a development environment required to execute an application, comprising first subprocesses for identifying a known component required to execute the application; second subprocesses for identifying components required by the known component for execution of the application; and third subprocesses for identifying components required by the components identified in the second subprocesses and the third subprocesses for execution.

The first subprocesses may permit a user to identify at least one known component, or may query a component of the application to identify itself and uses the identified component as the known component. The application may be an object oriented application under development, the computer readable code may further comprise fourth subprocesses for packaging the application to include only the known component and the identified components. Preferably, only a single instance of the identified components is included in the packaged application. The computer readable code may further comprise fifth subprocesses for identifying common components required to execute any application. The application may be an object oriented application comprising methods and classes, the known component being a method, wherein the second subprocesses further comprise identifying methods and classes referenced by the known method.

Additionally, the present invention provides a system in a computing environment for determining a required set of components from an application development environment for an application being created, comprising means for identifying a first component required to execute the application; means for identifying a first set of components referenced by name or required by the first component for inclusion in the application; and means for identifying a second set of components referenced by name or otherwise required by individual components of the first second set of components and by individual ones of the second set of components after the individual ones are identified for inclusion in the application; and means for creating a list of required components from the first component, the first set of components and the second set of components. The system may further comprise means for including each of the required components only once on the list.

The present invention will now be described with reference to the following drawings, in which like reference numbers denote the same element throughout.

DESCRIPTION OF THE PREFERRED EMBODIMENT

Figure 1:
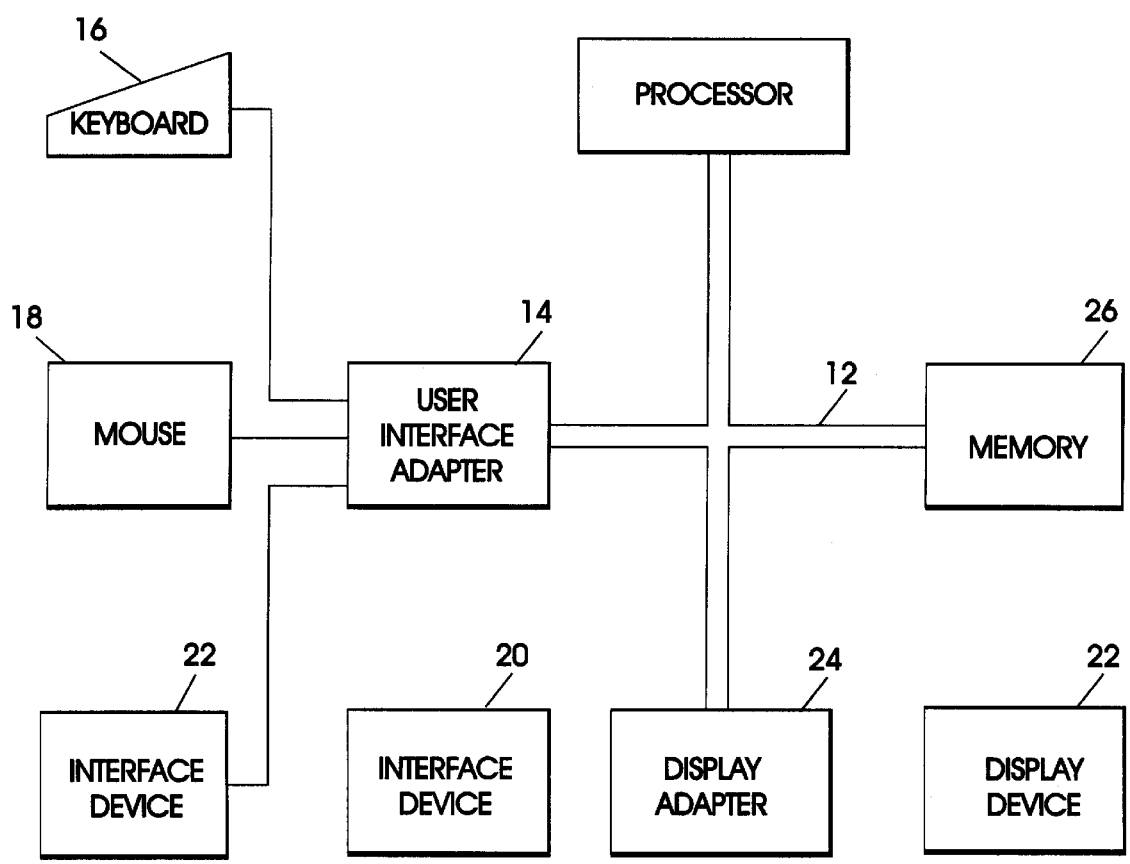
FIG. 1 is a block diagram of a representative hardware environment in which the present invention may be practiced.

The present invention as described may be performed in an of a variety of object oriented development languages, such as Smalltalk, C++, ScriptX, etc. FIG. 1 illustrates a representative hardware environment in which the present invention may be practiced. The environment of FIG. 1 is representative of a conventional single user of a computer workstation, such as a personal computer and related peripheral devices. The environment includes a microprocessor 10 and a bus 12 employed to connect and enable communication between the microprocessor 10 and the components of the workstation in accordance with known techniques. The workstation will typically include a user interface adapter 14, which connects the microprocessor 10 via the bus 12 to one or more interface devices, such as a keyboard 16, a mouse 18, and/or other interface devices 20, which can be any user interface device, such as a touch sensitive screen, digitized pen entry pad, etc. The bus 12 also connects a display device 22, such as an LCD screen or monitor, to the microprocessor 10 via a display adapter 24. The bus 12 also connects the microprocessor 10 to memory 26, which can include ROM, RAM, etc.

Software programming code which employs the present invention is typically stored in the memory 26 of the standalone workstation environment. In a client/server environment, the software program code may be stored with memory associated with the server. The software program code may be embodied on any of the variety of known media for use with a data processing system, such as a diskette or CD-ROM. The software program code may be distributed on such media, or may be distributed to users from the memory of one computer system over network of some type to other computer systems for use by users of such other systems. Such techniques and methods for embodying software code on physical media or distributing software code via networks are well-known and will not be further discussed herein.

The present invention is described below in its preferred embodiment, which is as part of a Smalltalk development environment. The Smalltalk development environment may operate on any of a variety of combinations of operating systems and hardware, and will be described independent of any specific operating system and hardware. Smalltalk is a dynamic object oriented language and is referred to as a pure object oriented language since it conforms to all the basic definitions of an object oriented language, such as inheritance, polymorphism, etc. These concepts will not be discussed herein. Some other object oriented languages, such as C++, differ somewhat in architecture. However, the same packaging problem described herein is also present in most other object oriented languages, and the solution described herein is also directly applicable to those other object oriented languages.

Figure 2:
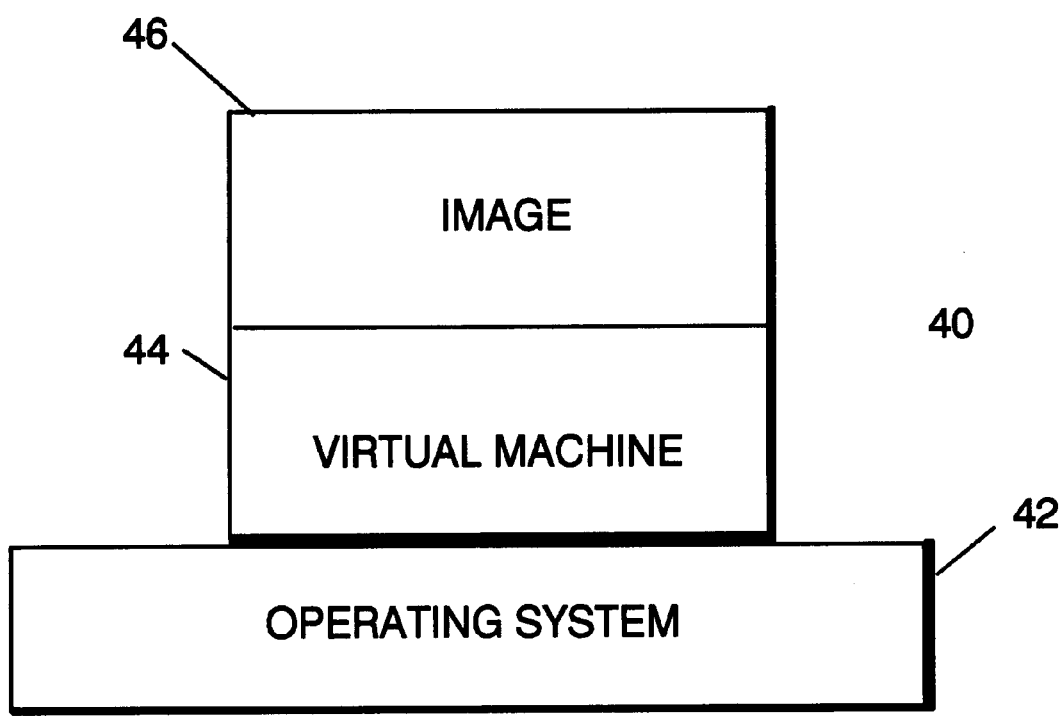
FIG. 2 is a diagram of the architecture of an object oriented application development environment.

FIG. 2 illustrates the basic architecture of a Smalltalk object oriented development environment, such as visualAge for Smalltalk from IBM. The object oriented development environment 40 is itself an application which runs on an underlying operating system 42. The portion of the development environment 40 known as a virtual machine 44 interacts with the operating system 42. The Smalltalk development environment is hierarchical, and an image portion 46 of the development environment 40, contains hierarchies of classes tied into the virtual machine 44 and can be viewed as logically running on top of the virtual machine 44. The image 46 is the portion of the development environment 40 with which a developer interacts to develop an object oriented application. The image portion 46 of the development environment 40 includes a variety of classes provided in different hierarchies, which provide functions at many different levels. At a high level, an entire set of classes may comprise a framework which provides a substantially complete function desired by the developer, which a developer may pull into the application being developed. On the other hand, the function may not be provided in such a neat package as a framework by the development environment, thus requiring the developer to combine relatively low level classes or individual classes or to write new classes in order to create the desired function for the application being developed.

The image 46 also includes application development tools, which differ in different environments. The tools may include a class browser for viewing classes and methods, version control systems for permitting incremental development and saving of applications under development, debuggers for debugging applications created using the development environment 40, etc. The development environment also includes a Smalltalk compiler which links and compiles portions of the application. Smalltalk being an interpreted language, portions of the application will remain in byte-code form, which are interpreted by the run-time engine during execution.

Figure 3:
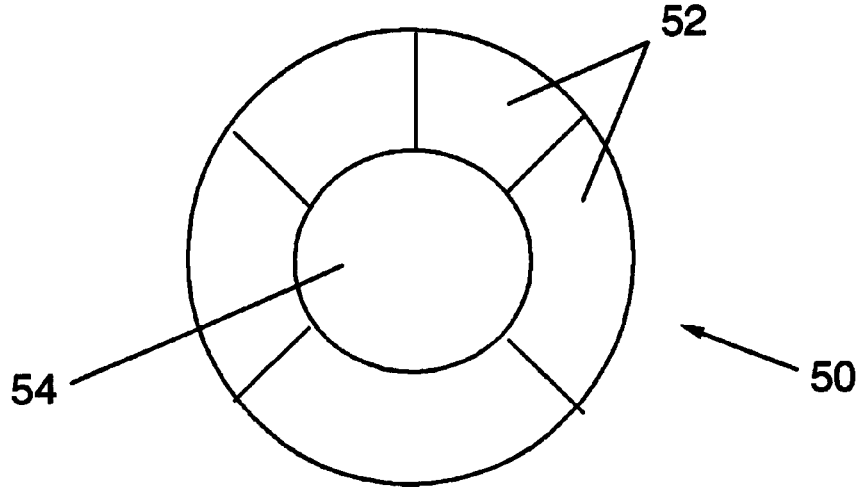
FIG. 3 illustrates an object oriented object.

FIG. 3 is an industry standard representation of an object 50. Methods 52 of the object 50 provide function, while a data portion 54 includes data associated with the object 50.

An object is an instantiation of a class from the hierarchy of classes which a developer has designated for use in an application. The same class may be used many times in an application.

Figure 4:
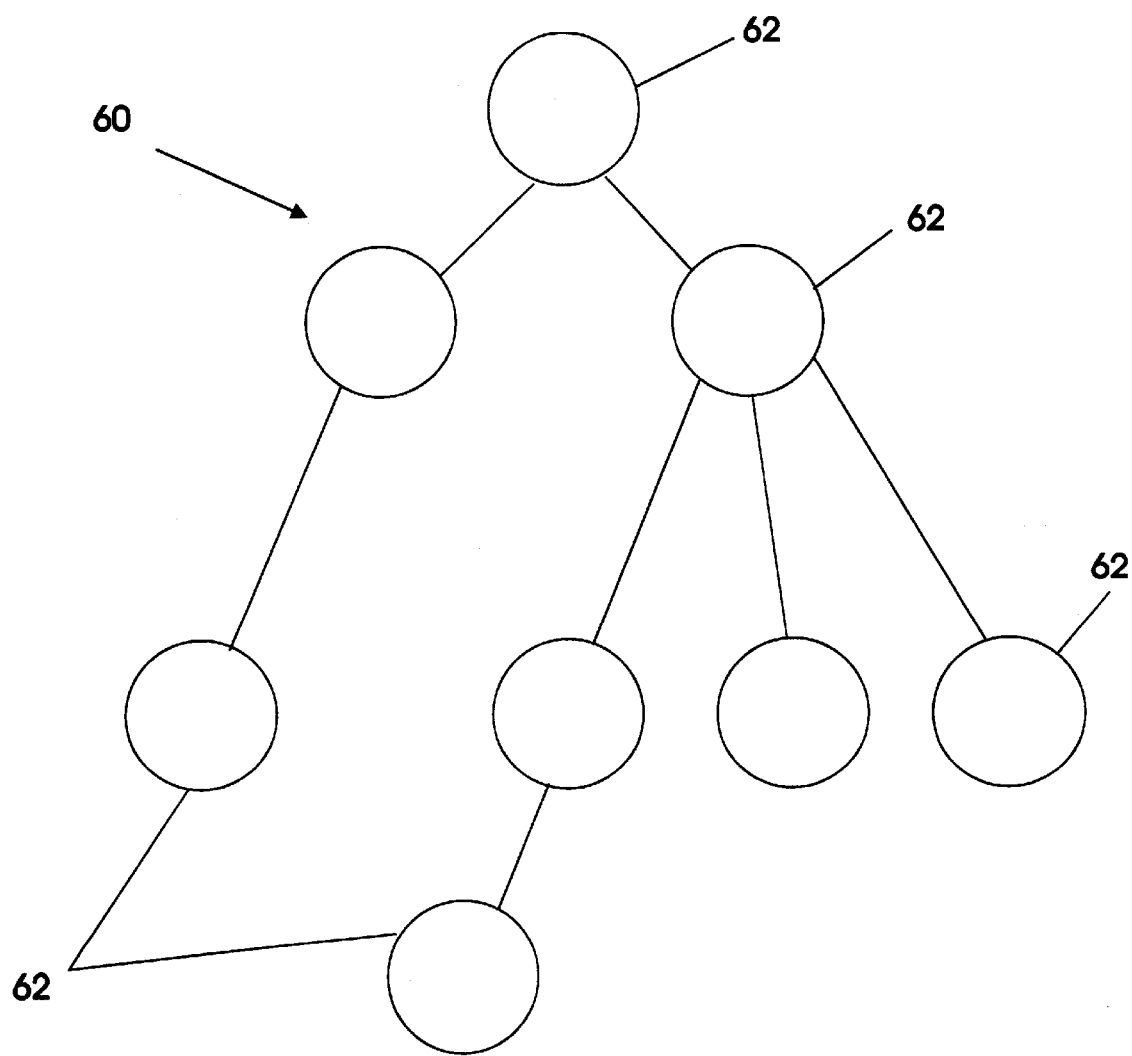
FIG. 4 is a diagram of a typical hierarchical relationship between related classes of an object oriented language.

FIG. 4 illustrates a hierarchy 60 of classes 62. Object oriented hierarchies employ the concept of superclasses and subclasses. A class inherits all variables and methods from classes which are higher in the hierarchy of classes (super classes). The inheriting class is referred to as a subclass of its super classes.

In view of this architecture, prior art packaging algorithms have dealt with packaging very conservatively. Prior algorithms tend to be relatively indiscriminate as to which classes they include when packaging applications. While the approach seldom misses necessary classes, this insistence of erring on the side of safety results in applications having unwieldy size and thus having large memory requirements and sometimes less than optimal performance.

Figure 5A:
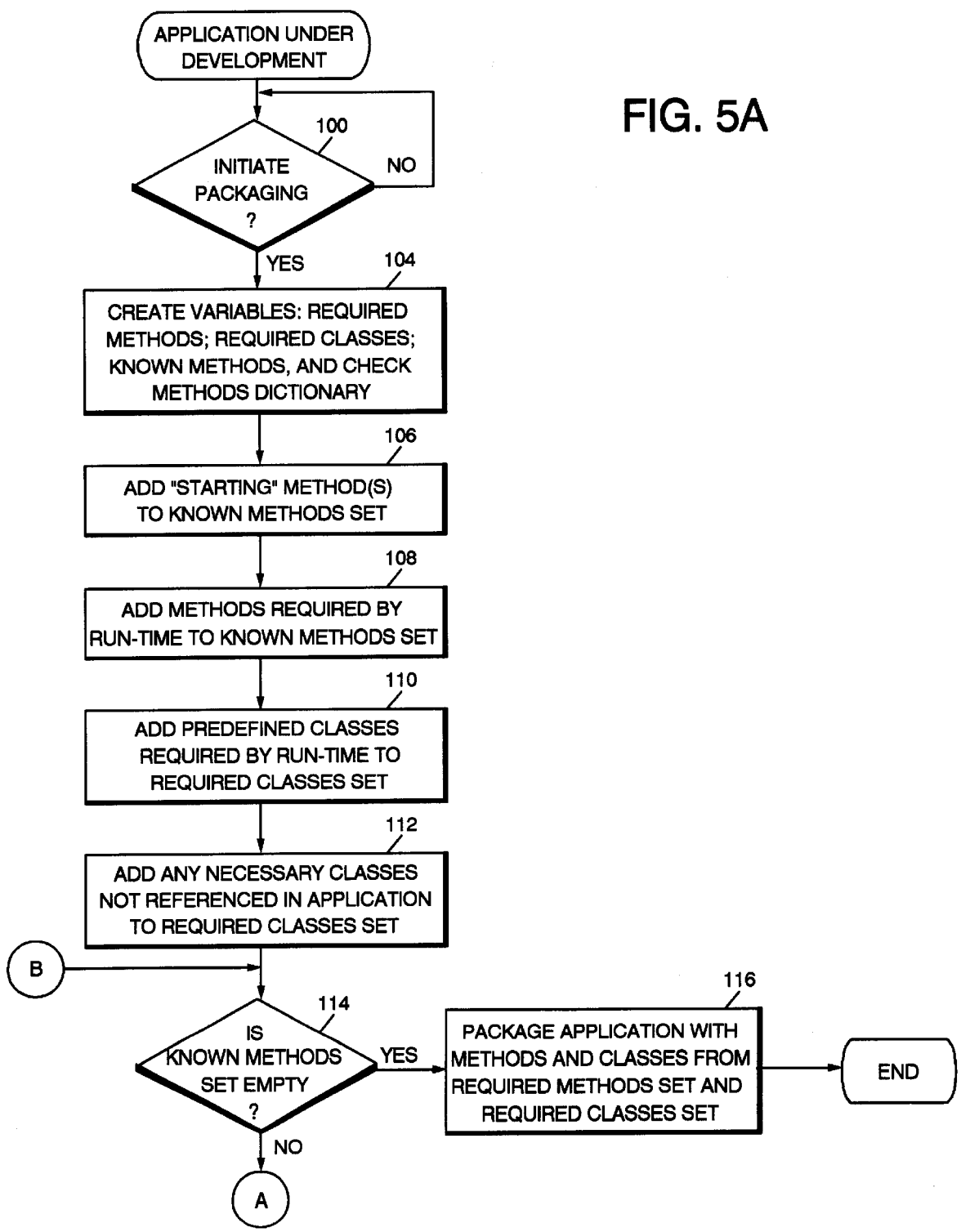
FIG. 5 is a flowchart illustrating the logical steps of the packaging algorithm of the present invention.
Figure 5B:
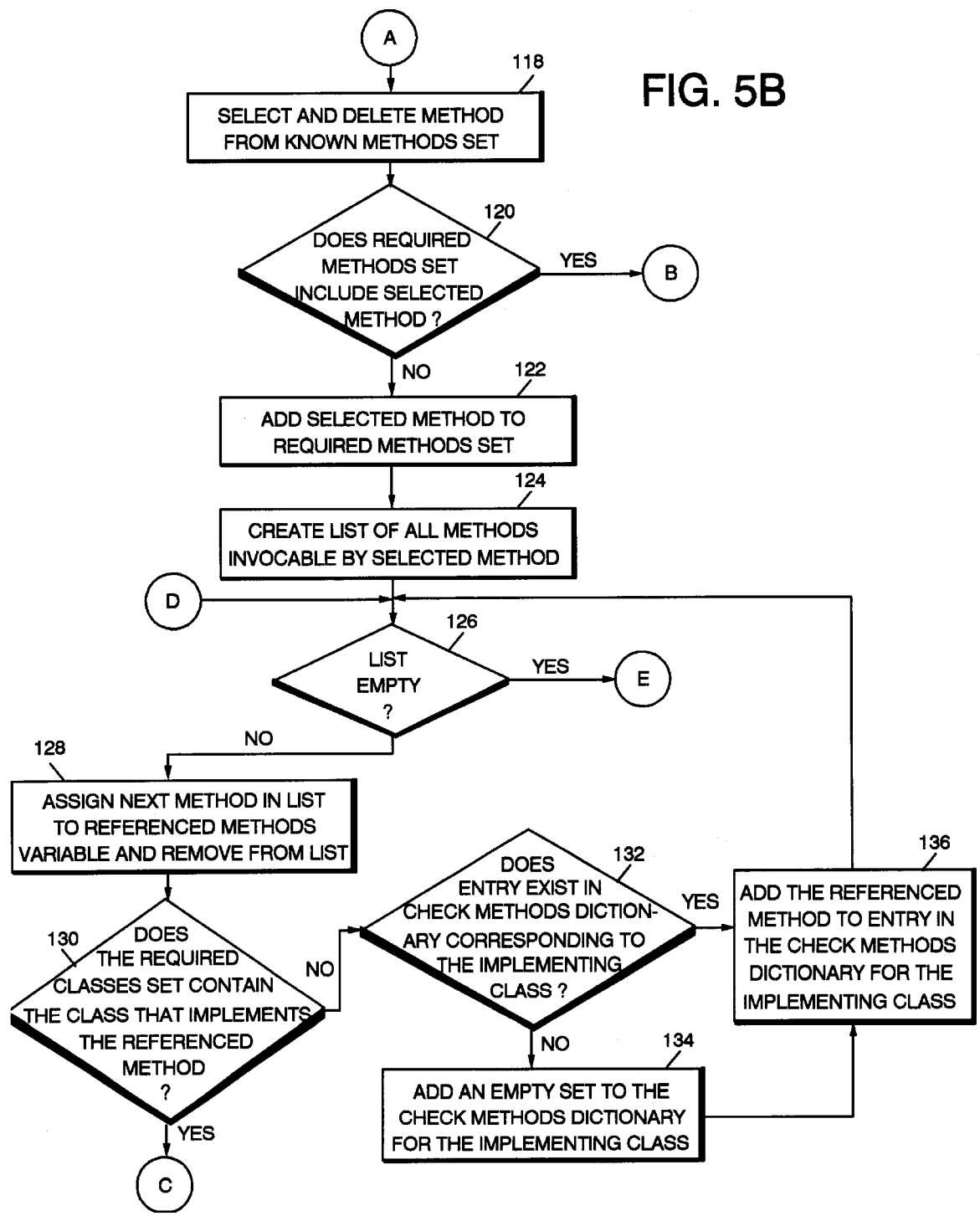
Figure 5C:
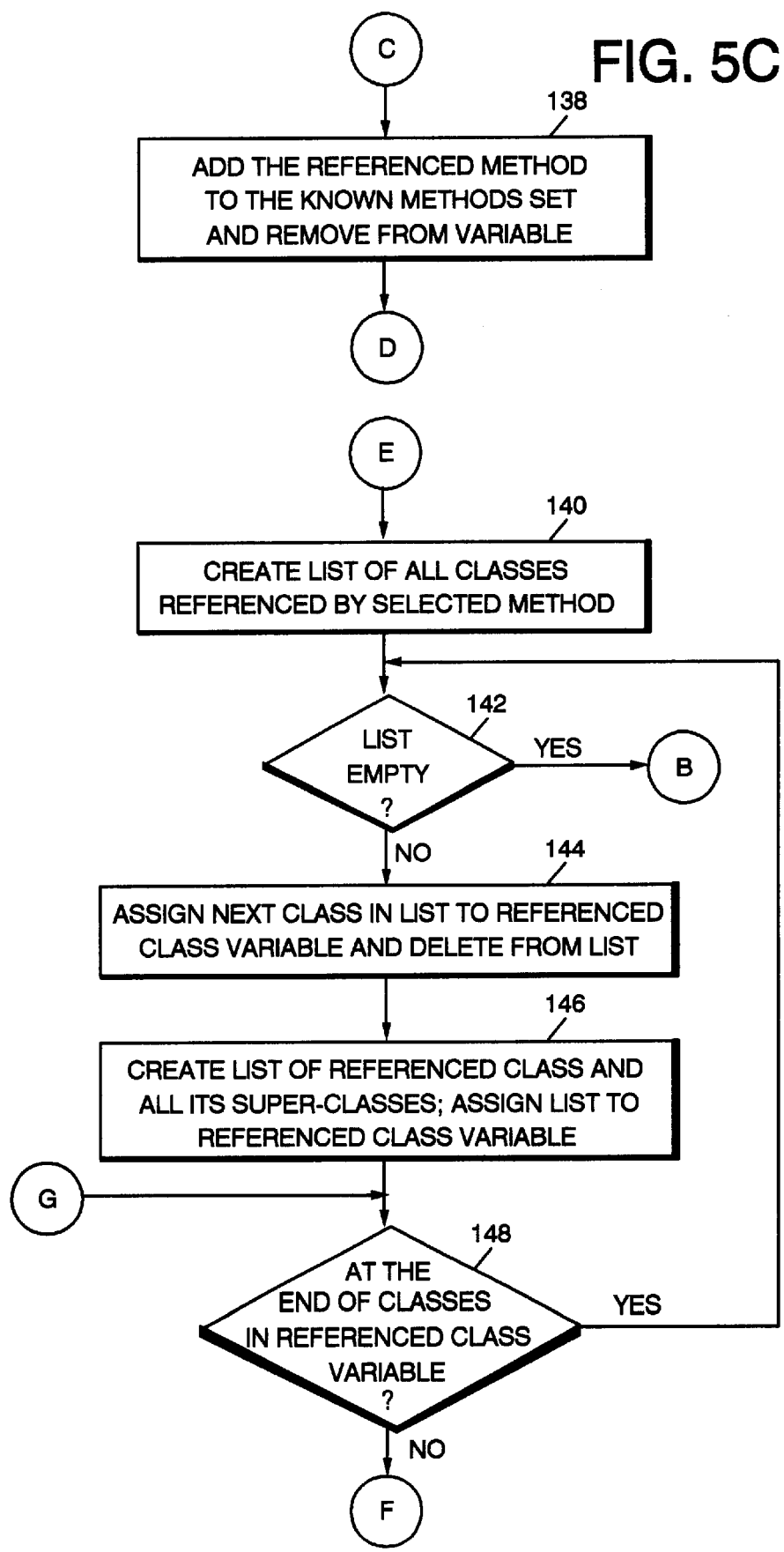

As with the prior art, when a developer has finished developing an application in the development environment, the developer implements the packaging function within the development environment. The packaging algorithm determines which classes are to be included with the run-time engine in the executable application. The packaging algorithm of the present invention will now be described relative to the flowchart of FIG. 5.

The packaging algorithm of the present invention analyzes the code in the application and its associated reusable code libraries to determine a minimum subset of the code that is required to allow the application to be executed. The algorithm is employed in the linking or packaging step, and it determines a minimum defined set of classes and/or methods required for the application to be executed. The minimum defined classes and methods are referred to as the 'required classes' and 'required methods' in the description which follows. The present invention utilizes the fact that an object oriented application executes in such a manner that the instances of the classes (objects) send messages to each other. Thus, many of the required classes and methods are interrelated. The packaged application will include the required classes and methods from the development environment which span the virtual machine, image, and class libraries, as well as code from the virtual machine required to execute the application at run-time. The code required for execution from the virtual machine typically remain static for all Smalltalk applications.

An initial 'starting method' from the image portion of the application being packaged may need to be defined by the developer, depending on the implementation and language. From the starting method, the algorithm traverses all references to classes and other methods in the application and reusable class libraries to determine the set of required methods and classes.

Accordingly, when a developer has finished developing an application, the developer inputs a command to the development environment to initiate packaging (Step 100). Thereafter, the program creates a number of variables, including a Required Methods set, a Required Classes set, a Known Methods set, and a Check Methods dictionary. All these elements are initially empty (Step 104). As the algorithm determines that methods and classes from the development environment are necessary for execution of the application, they are added to the Required Methods set and Required Classes set, respectively. The application will subsequently be packaged with only those methods and classes defined in these sets. The methods contained in the Known Methods set will be added to the Required Methods set (if not already included) and processed in accordance with the algorithm to identify classes and other methods which are also necessary and/or should be processed themselves to identify other necessary classes and methods. The Check Methods dictionary is employed to help identify necessary methods. Other variables will also be employed by the algorithm, as discussed below.

A starting method or methods identified by a user or by the program itself in an automatic query are added to the Known Methods set (Step 106). As discussed previously, in Smalltalk, a known portion of the virtual machine and image are required to execute the application code for any application. Generally, the methods and classes required to execute the run-time application are known. Accordingly, the required run-time methods are added to the Known Methods set (Step 108) and required classes for run-time execution are added to the Required Classes set (Step 110).

In some cases, some classes which are required by the application code do not exist within the application development environment itself and are not identifiable by method name. For example, such classes may exist in a persistent store which the application might read during execution. However, without a specific reference to the methods in the persistence store, the algorithm will not search for such methods or classes, and thus will not identify them for packaging. Accordingly, all such necessary classes are added to the Required Classes set at this time (Step 112). Most often, the location of these classes will be provided by the application developer; however, an automatic query may be built in to the packaging step whereby locations for such classes may be found so that such classes are automatically added to the required classes set.

The algorithm initiates its search for the minimum defined set of classes and methods using the contents of the Known Methods set. When it is finally determined that the known methods set is empty in Step 114, the minimum defined set of classes and methods will have been defined, and the application can be packaged including only the methods and classes from the Required Methods set and the Required Classes set (Step 116). However, initially, as the Known Methods set has been seeded with starting methods either by the user or automatically in Step 106, the Known Methods set will not be empty, and processing will proceed to Step 118. In Step 118, a method is selected from the methods in the Known Methods set and deleted therefrom. The method may selected randomly from the set or be the first method listed in the Known Methods set. The Required Methods set is then checked to see if it already includes the selected method (Step 120). If so, processing returns to Step 114. If the selected method is determined to not already be included in the Required Methods set in Step 120, processing proceeds to Step 122, in which the selected method is added to the Required Methods set. Next, a list is created of all the methods invocable by the selected method (Step 124). Given the nature of Smalltalk, a typical method sends messages to one or more other methods in order to perform processing during execution. The list created in Step 124 consists of these other methods. In situations where the selected method does not invoke any other method or after the entire list of methods has been processed, the list will be found to be empty in Step 126, and processing will jump to Step 140. However, until the list is actually determined to be empty in Step 126, the first or next method in the list is assigned to a Referenced Method variable and is removed from the list (Step 128). In Step 130, it is then determined if the Required Classes set already contains the class that implements the method which is contained in the Referenced Method variable. If so, the referenced method is added to the Known Methods set and removed from the Referenced Method variable (Step 138). Processing then returns to Step 126 for the next method in the list, if any.

If it is determined in Step 130 that the Required Classes set does not contain the class that implements the referenced method, it is then determined whether an entry exists in the Check Methods dictionary corresponding to the implementing class (Step 132). If it is determined in Step 132 that no such entry exists, an empty set is added to the Check Methods dictionary for the implementing class (Step 134). If it is determined in Step 132 that an entry does exist for the implementing class, or after an entry corresponding to the implementing class is created in Step 134, the referenced method is added to the entry in the Check Methods dictionary for the implementing class (Step 136). The referenced method is removed from the variable and processing then returns to Step 126 for the remaining methods in the list, if any.

When it is determined in Step 126 that the list is empty, processing proceeds to Step 140, in which a list of all classes referenced by the selected method (from Step 118) is created. In Smalltalk, separate from the reference to other methods (which are processed by Steps 124–138), a method may also reference a number of classes. The processing described below identifies those referenced classes and their parent or super classes which have not already been added to the Required Classes set.

It is first determined in Step 142 whether the selected method references any classes (or if the list has become exhausted by processing). If so, processing returns to Step 114 to process the next method in the Known Method set. If the list contains a reference for at least one class, one of the classes in the list is assigned to a Referenced Class variable and deleted from the list (Step 144). Next, the Referenced Class variable is updated to include the referenced class and all of its super classes. The technique for determining super classes for a given class is well-known and need not be discussed herein.

Step 148–160 then process the classes now listed in the Referenced Class variable. After the processing of Steps 150–160 has exhausted the list, Step 148 causes processing to Step 142. While the list of classes in the Referenced Class variable still contains classes, processing proceeds to Step 150, whereby the first or next element or class in the Referenced Class variable assigned to a aReferenced Class variable and deleted from the Referenced Class variable (Step 150). In Step 152, it is then determined if the class in the aReferenced Class variable is already contained in the Required Classes set. If so, processing returns to Step 148 for the next class in the Referenced Class variable, if any. If it is determined in Step 152 that the class is not already in the Required Classes set, then the class is added to the Required Classes set (Step 154). In Step 156, processing then determines whether or not an entry exists for the class in the aReferenced Class variable in the Check Methods dictionary (Step 156). If no such entry exists, processing returns to Step 148. If it is determined in Step 156 that such an entry does exist in the Check Methods dictionary, then processing proceeds to Step 158, in which all methods in the corresponding entry in the Check Methods dictionary are added to the Known Methods set. The entry corresponding to the class in the aReferenced Class variable and its methods are then removed from the Check Methods dictionary and the class is removed from the aReferenced Class variable (Step 160). Processing then returns to Step 148 for any remaining classes in the Referenced Class variable.

When it is determined in Step 148 that no more classes are listed in the Referenced Class variable, processing proceeds back to Step 142 for remaining classes in the list of classes referenced by the selected method. When it is determined in Step 142 that the list is empty, processing then returns to Step 114 for processing relative to the next method in the Known Methods set. At the time when processing returns to Step 114 and no further methods exist in the Known Methods set, the algorithm will have identified the required minimum set of classes and methods. These classes and methods will be listed in the Required Classes set and Required Methods set, respectively. Packaging of the application is then carried out in accordance with known techniques as per Step 116, such that the only methods and classes included in the packaged application are those methods and classes identified in the Required Methods set and Required Classes set. The specific processing techniques for packaging an application will not be discussed herein as they are well-known and practiced presently in the art.

While the algorithm has been presented specifically for Smalltalk, it is also generally applicable to the packaging step of other languages in which procedures or routines are called by name. While it is clearly applicable to other object oriented languages, such as C++ and ScriptX, it may also be applicable to packaging of C code libraries and the like.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and also variations and modifications as fall within the spirit and scope of the invention.

What is claimed is:

1. Computer readable code for determining a minimal set of classes and methods necessary for an object oriented application under development to execute, comprising:

first subprocesses for identifying a known method and adding the method to a known method list;

second subprocesses for selecting a method from the known method list and deleting the selected method from the known method list;

third subprocesses for determining whether the selected method is included in a required methods list, and if so, repeating said second subprocesses;

fourth subprocesses for adding the selected method to the required methods list and creating a list of methods referenced by the selected method;

fifth subprocesses for determining, relative to each referenced method, whether an implementing class of each referenced method is included in a required classes list;

sixth subprocesses for adding each referenced method to the known method list if it is not determined in said fifth subprocesses to have its implementing class in the required classes list;

seventh subprocesses for checking for an entry in a check methods list corresponding to each said implementing class if it is determined in said sixth subprocesses that the implementing class is a required class, creating an entry in the check methods list if no entry exists, and adding the implementing method to the entry for its implementing class in the check methods list;

eighth subprocesses for creating a first class list of classes referenced by the selected method;

ninth subprocesses for creating a second class list for each referenced class in the first class list including the referenced class and all super classes of the referenced class;

tenth subprocesses for determining relative to each class in the second class list whether the class included is in the required classes list, and if not, adding the class to the required classes list, checking for an entry corresponding to the class in the check method list, and, if an entry exists, adding each method in the entry to the known methods list and deleting the entry from the check methods list; and eleventh subprocesses for repeating said second through tenth subprocesses, as appropriate, until the known methods list is empty.

2. A method for determining a minimal set of components necessary for an object oriented application being created to execute, comprising the steps of:

(a) identifying a known component from the object oriented application and adding the identified component to a first list;

(b) selecting a component from the first list and deleting the selected component from the first list;

(c) determining if the selected component is included in a required component list, and if so, repeating said selecting step for a new component;

(d) if said determining step determines that the selected component is not on the required component list, adding the selected component to the required component list;

(e) creating a referenced component list for components referenced by the selected component;

(f) determining, relative to each of the referenced components, whether each of the referenced component is included in the required component list, and adding each of the referenced components to the first list if it is not in the required component list; and (g) repeating said steps (a) through (f) until the first list is empty.

* * * * *